Oct. 9, 1951   R. J. IMBERT   2,570,682
FLUID THRUST BEARING
Filed April 15, 1947   2 Sheets-Sheet 1

INVENTOR
R. J. Imbert
By Watson, Cole, Grindle & Watson
ATTORNEYS

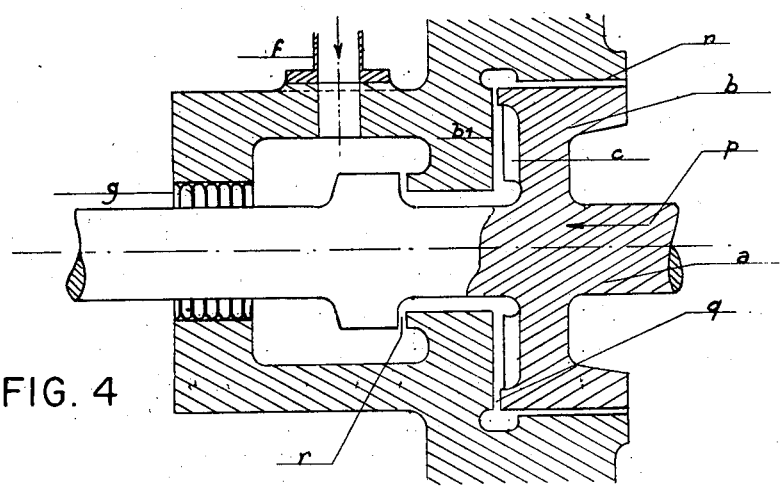
FIG. 4
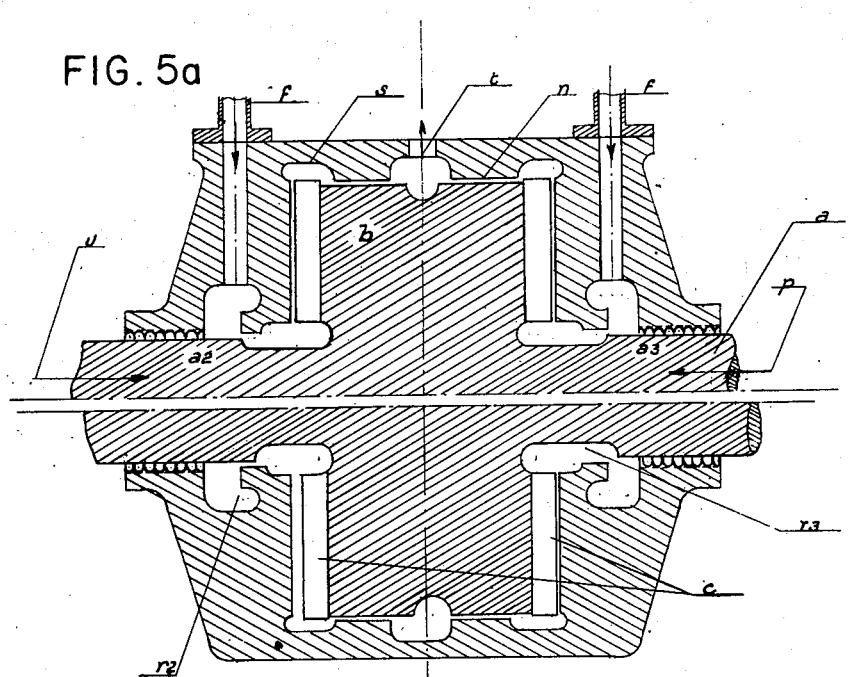
FIG. 5a
FIG. 5b
INVENTOR
R. J. Imbert
By Watson, Cole, Grindle & Watson Patented Oct. 9, 1951

2,570,682

UNITED STATES PATENT OFFICE 2,570,682

FLUID THRUST BEARING

Roger Jean Imbert, Paris, France, assignor to Societe Rateau (Société Anonyme), Paris, France, a company of France, and René Anxionnaz, Paris, France Application April 15, 1947, Serial No. 741,476
In France April 29, 1946

3 Claims. (Cl. 308—9)

In numerous technical problems relating in particular to turbomachines and more particularly in the case of axial compressors adapted to be used in terrestrial, marine or airborne arrangements, one is led to provide on the shafts longitudinal stops or abutments adapted to resist stresses which are important with reference to their possible size and to the high speed of rotation of such apparatuses, as the design of such machines does not allow obtaining in many cases the complete equilibrium of the longitudinal thrusts through the action of the compressed fluid. For instance, in certain applications, it may be necessary to design an abutment adapted to resist efforts of 15 tons exerted on shafts rotating at 9000 R. P. M.

Thrusts of this importance are very difficult to resist by means of abutments of any known type even when using to the utmost the properties of oil films as in the case of rocking abutments because the high speed of the shaft limits the diametrical size, which leads to specific pressures which cannot be allowed.

The present invention has for its object an abutment system wherein the thrust is absorbed by a fluid under pressure the specific weight of which is much higher than that of the fluid normally operated by the turbine, say oil in the case of an air compressor, the thrust being achieved by said fluid through the agency of a compensating plate or piston rigid with the shaft while the fluid pressure is automatically adjusted as a function of the thrust, which is obtained through the provision of a passageway for the fluid the cross-sectional area of which varies with the thrust.

Preferably the pressure of the fluid is obtained by a centrifugal pump driven by the movable member cooperating with the abutment; the rotor of this pump is preferably constituted by the plate or piston used for purposes of equilibrium and provided to this end with vanes or blades driving the fluid into rotation. The following description given out with reference to accompanying drawing of examples which are by no means limiting will allow a proper understanding of the invention, the features appearing both in the drawings and in the specification forming of course part of said invention. In the drawings:

Fig. 4 shows a modification of an abutment adapted to automatically adjust the output of oil.

Figs. 5a and 5b show an abutment similar to that of Fig. 4 adapted for double action, i. e. capable of absorbing the thrusts in either direction.

Figure 1:
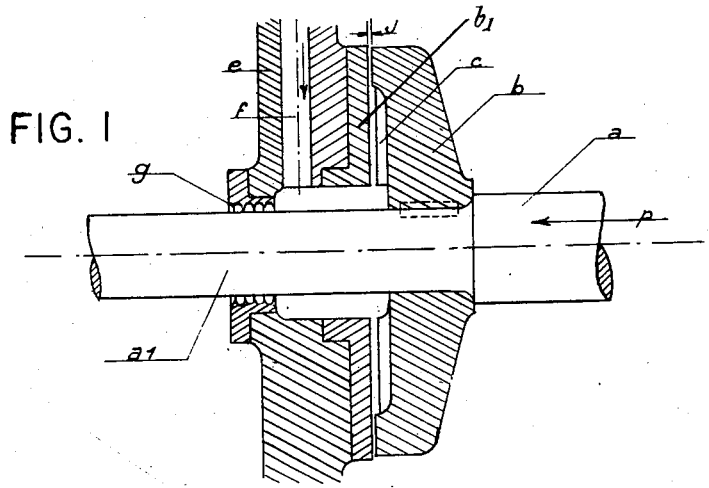
Fig. 1 is an axial cross-section of a form of execution of a simple stop according to the invention.
Figure 2:
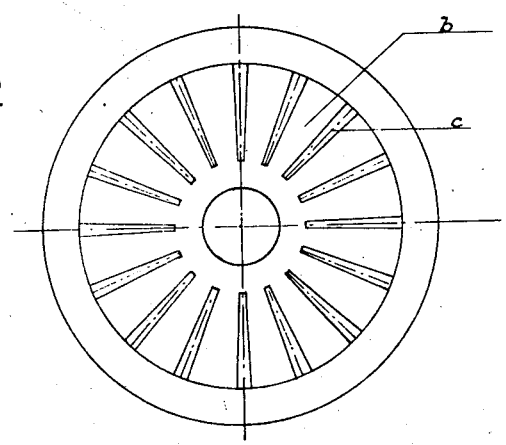
Fig. 2 is a front view of the piston-forming plate acting on the fluid.

In the form of execution illustrated in Figs. 1 and 2, $a$ illustrates the shaft of a turbo-machine submitted to the thrust $p$ and adapted to abut against the casing $e$ of the machine through which the shaft passes at $a1$. To said shaft is keyed a plate or piston $b$ through which the shaft bears with the interposition of an oil layer admitted through the pipe $f$ and flowing out through the clearance $j$ between said plate and the stationary part $b1$ of the abutment provided on the casing.

The pressure of the oil is generated by means of grooves hollowed out of the piston and forming thereon blades $c$ or by means of another similar arrangement which obliges the oil to rotate during the rotation of the shaft $a$ and causes in the oil a centrifugal pressure which is a function of the rotation speed of shaft $a$.

The pressure thus generated is maintained to a suitable value by the peripheral part of the piston $b$ which, in cooperation with the bearing surface $b1$ of the casing, limits the output of the auxiliary centrifugal pump consisting of parts $c$ and $b1$ through the small gap between piston $b$ and bearing surface $b1$.

The thrust of the movable member in the direction of the arrow $p$ is counter-balanced by the pressure of the oil generated by the said auxiliary centrifugal pump. The data concerning the execution of the system are such that the stress due to the oil pressure thus generated may be higher than the thrust to resist when the leak output is reduced to zero, that is when the pump produces its maximum pressure.

If the thrust becomes too considerable, the excess pressure displaces the movable member in a direction opposed to the arrow $p$, the clearance $j$ increases in width, which leads to a reduction in the pressure of the fluid and returns its value to a value corresponding to the thrust.

A fluidtight packing $g$ is provided in the casing at the point at which the shaft passes through same in order to ensure a correct operation of the pump. In certain cases, the thrusts may vary in particular in aircraft machines for which for a given speed such thrusts are proportional to the specific weight of the air sucked in, which means that they are four times less important at an altitude of 11,000 meters than at sea level. By reason of the power absorbed by the abutment, it is of major interest to allow its adaptation either by reducing the amount of injected fluid or by reducing the height of the fluid ring by means of exaust ports as provided in Fig. 3.

Figure 3:
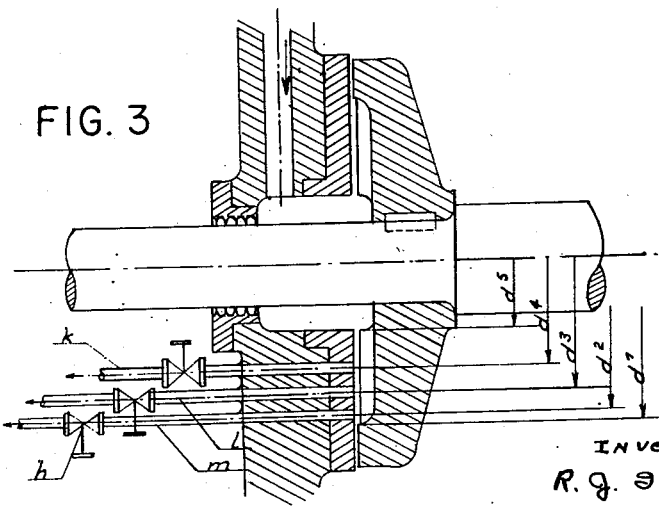
Fig. 3 is an axial cross-sectional view of an abutment executed according to the same principle but adapted for adjustment suiting important variations in the thrust to be equilibrated.

In said Fig. 3, I have shown by way of example three exhaust ports $klm$ corresponding to three different diameters and each of which may be closed by a cock $h$.

When all the cocks are closed the fluid ring extends between the levels $d1 d5$.

If the thrust to be equilibrated for a predetermined rate of running has a value which is lower than the opposite stress of the fluid pressure corresponding to said ring $d1 d5$; it is sufficient to open one of the discharge cocks $h$ so as to obtain the desired equilibrium with reference to the thrust through a corresponding modification of the height of the fluid ring.

The opening and closing of the cocks may be operated from a distance through any suitable known mechanical or hydropneumatic means, while an indicating instrument giving out the values of the thrust may be provided on the control board so that the operator may be aware of the operations to be executed for obtaining the equilibrium of the thrusts whatever may be the rate of running.

In the case of an aircraft, the adjustment may be operated directly for instance through the altimeter which is carried on board.

The abutment illustrated in Fig. 4 is a modification of the arrangement of Fig. 1, which has for its advantage an automatic adjustment of the fluid output.

It includes means for constantly throttling the fluid at the upper cylindrical part of the piston $b$ through the gap $n$, between the peripheries of the stationary abutment $b1$ and of the plate $b$ on the shaft $a$.

The automatic adjustment of the fluid output is obtained through a modification of the clearance $r$ between the stationary part $b1$ of the abutment and the movable plate $b$ rigid with the shaft $a$.

If the axial thrust in the direction of the arrow $p$ is larger than that produced by the pressure of the fluid, said clearance $r$ increases in size which allows a larger feed of the pump, generating thus a higher pressure in order to restore equilibrium.

Figs. 5$a$ and 5$b$ show a double acting abutment of the same type as that shown in Fig. 4.

In this case the fluid is admitted at $f$ through either side. In the example chosen, the radial vanes or blades $c$ enter at their outer end into an annular chamber $s$ communicating with an outlet $t$ through the agency of throttles $n$.

The clearances $r2$ and $r3$ are provided between the corresponding shoulders $a2$ and $a3$ on the movable part on one hand and the stationary part on the other hand.

Fig. 5$a$ shows the double abutment in the position corresponding to an equilibrium between the longitudinal thrusts $p$ and $u$ exerted in opposite directions on the shaft $a$.

Fig. 5$b$ shows the position of the movable member $a$ when the thrust $u$ becomes larger than the thrust $p$.

The throttling at $r2$ limits then the admission of fluid to the left hand pump and the pressure generated by the latter is reduced while on the contrary the right hand pump is fed to a greater extent and generates a higher pressure allowing equilibrium. Obviously the forms of execution disclosed hereinabove have been given out solely by way of examples and may be modified chiefly by way of replacement of certain parts by equivalent technical means without widening thereby unduly the scope of the invention as defined in accompanying claims.

What I claim is:

1. In a turbo-machine having a rotary shaft liable to be subjected to axial thrusts in both directions, the combination of a stationary hollow casing around a part of said shaft, fluid-tight connections between said shaft and said casing at each end thereof, said connections being adapted to allow axial displacement of said shaft relatively to said casing, a cylindrical drum integral with said shaft and located inside said casing, an impeller on each face of said drum, adapted to centrifugally circulate a fluid, fluid outlets in the vicinity of the periphery of said impellers, fluid inlets in the vicinity of the central part of said impellers, means responsive to axial displacements of said shaft for throttling down one of said inlets while the other is throttled up, whereby an axial displacement of the shaft in any direction causes the resultant fluid pressure on the faces of the drum to increase in the opposite direction.

2. In a turbo-machine having a rotary shaft liable to be subjected to axial thrusts in both directions, the combination of a stationary hollow casing around a part of said shaft, fluid-tight connections between said shaft and said casing at each end thereof, said connections being adapted to allow axial displacement of said shaft relatively to said casing, a cylindrical drum integral with said shaft and located inside said casing, an impeller on each face of said drum, adapted to centrifugally circulate a fluid, fluid outlets in the vicinity of the periphery of said impellers, fluid inlets in the vicinity of the central part of said impellers, throttling means on said inlets each comprising a fluid passage bounded on the one hand by a stationary portion integral with said casing and on the other hand by axially movable portion integral with said shaft, the gap between said portions of one throttling means being adapted to increase when the shaft moves axially in one direction, while the gap between said portions of the other throttling means being adapted to decrease, whereby an axial displacement of the shaft in any direction causes the resultant fluid pressure on the faces of the drum to increase in the opposite direction.

3. In a turbo-machine having a rotary shaft liable to be subjected to axial thrusts in both directions, the combination of a stationary hollow casing around a part of said shaft, fluid-tight connections between said shaft and said casing at each end thereof, said connections being adapted to allow axial displacement of said shaft relatively to said casing, a cylindrical drum integral with said shaft and located inside said casing, an impeller on each face of said drum, adapted to centrifugally circulate a fluid, fluid outlets in the vicinity of the periphery of said impellers, fluid inlets in the vicinity of the central part of said impellers, throttling means on said inlets each comprising an annular recess in said casing and an annular recess in said shaft, said recesses being located in the vicinity of one another and adapted to cooperate for constituting a fluid passage, the cross-section of said passage belonging to one throttling means being adapted to increase when the shaft moves axially in one direction, while the cross-section of said passage belonging to the other throttling means being adapted to decrease, whereby an axial displacement of the shaft in any direction causes the resultant fluid pressure on the faces of the drum to increase in the opposite direction.

ROGER JEAN IMBERT.

REFERENCES CITED

The following references are of record in the file of this patent:

UNITED STATES PATENTS

| Number | Name | Date |
|---|---|---|
| 992,005 | Krogh | May 9, 1911 |
| 1,045,019 | Griesmann et al. | Nov. 19, 1912 |
| 1,057,007 | Paulsmeier | Mar. 25, 1913 |
| 1,105,808 | MacNeill | Aug. 4, 1914 |
| 1,112,518 | Brown | Oct. 6, 1914 |
| 1,436,265 | Kingsbury | Nov. 21, 1922 |
| 1,499,056 | Hollander | June 24, 1924 |
| 1,593,031 | Parsons | July 20, 1926 |
| 2,275,906 | Huntington | Mar. 10, 1942 |
| 2,362,667 | Schmidt | Nov. 14, 1944 |

FOREIGN PATENTS

| Number | Country | Date |
|---|---|---|
| 158,759 | Great Britain | Feb. 17, 1921 |